Patented July 14, 1925.

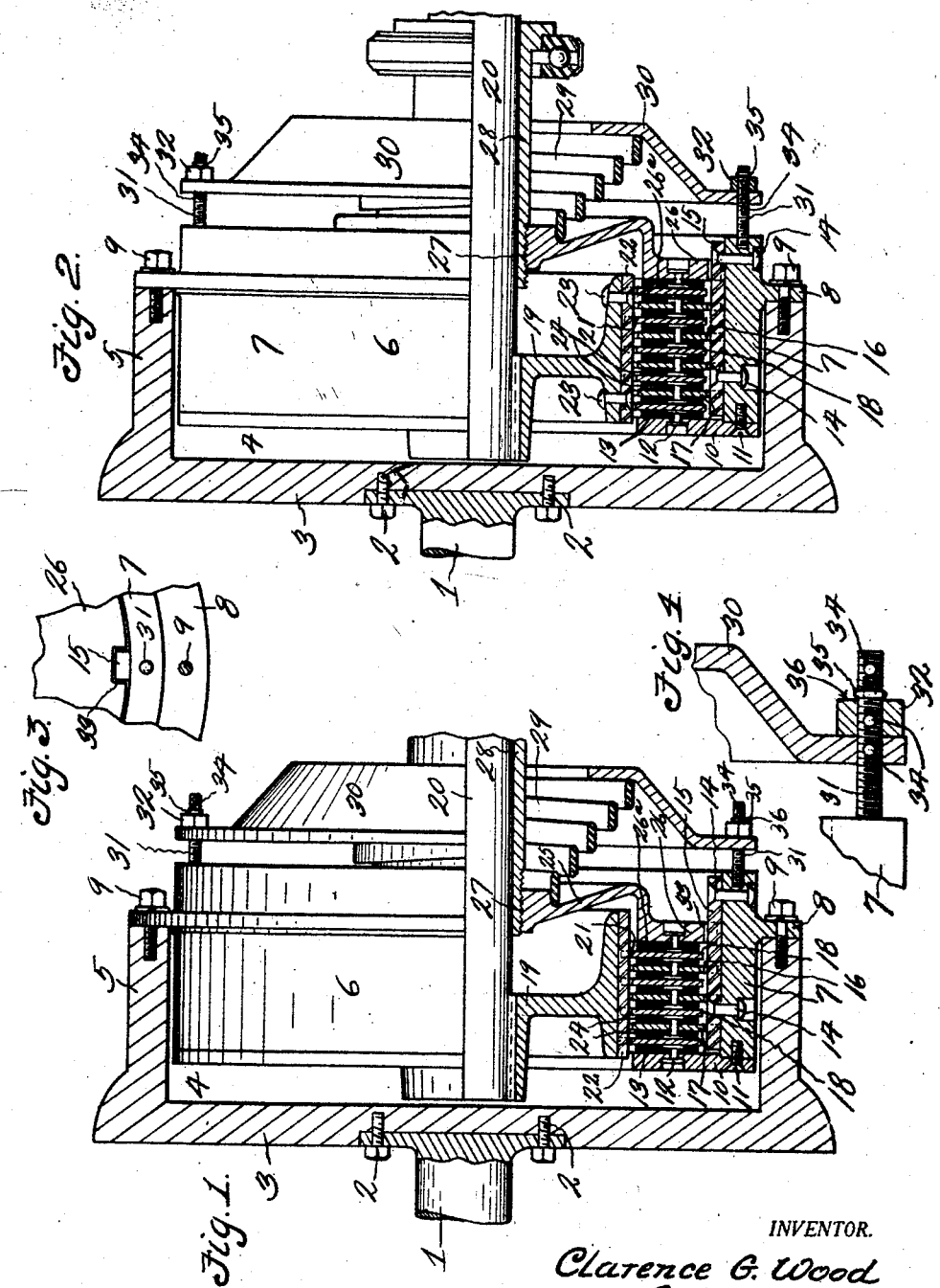

1,545,629

UNITED STATES PATENT OFFICE.

CLARENCE G. WOOD, OF MUNCIE, INDIANA, ASSIGNOR TO HOOSIER CLUTCH COMPANY, OF MUNCIE, INDIANA, A CORPORATION OF INDIANA.

CLUTCH.

Application filed December 5, 1921. Serial No. 519,927.

*To all whom it may concern:*

Be it known that I, CLARENCE G. WOOD, a citizen of the United States, residing at Muncie, in the county of Delaware and State of Indiana, have invented certain new and useful Improvements in Clutches, of which the following is a specification.

The invention relates to clutches, and has for its object to provide a clutch unit self contained within its own housing and so constructed that it may be adjusted by the manufacturer, then shipped to the user, particularly to automobile manufacturers who assemble the parts of an automobile, thereby allowing the self contained clutch to be easily and quickly applied to a flanged fly wheel without the necessity of adjusting the clutch as is at present the practice.

A further object is to provide a clutch unit comprising a casing formed from an annular casting, having a supporting flange adapted to be secured to the flange of a fly wheel, said annular casting having disposed therein a plurality of discs, some of which discs rotate with the casting and fly wheel, and the others with a driven member. Also to provide a pressure plate engaging the discs and rotatable with the annular casting, said pressure plate being forced inwardly by means of a spring interposed between the plate and a cover plate carried by studs extending outwardly from the side of the annular casting. The cover plate is easily removable for allowing the number of discs to be varied for transmitting the torque, for instance where the clutch is used in connection with a small or heavy duty motor.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a vertical longitudinal sectional view through the clutch, part being shown in elevation.

Figure 2 is a view similar to Figure 1, showing a greater number of friction discs, and the pressure plate under a greater spring pressure.

Figure 3 is a detail view looking into the annular clutch member, and showing a portion of the pressure ring.

Figure 4 is a detail sectional view on an enlarged scale, through one edge of the cover plate, showing the securing bolt therefor.

Referring to the drawings, the numeral 1 designates a drive shaft which is secured by means of bolts 2 to a fly wheel 3, which fly wheel is of the type wherein a chamber 4 is formed by an annular flange 5 carried by the fly wheel. Disposed within the chamber 4 is the clutch 6, which clutch is self-contained within its own housing thereby allowing the clutch unit as a whole to be adjusted at the time of manufacture and shipped to point of assembly in a motor vehicle or the like without the necessity of adjustment.

The clutch unit 6 comprises an annular member 7 preferably a single casting, which annular member is provided with a flange 8 adapted to be secured to the outer side of the flange 5 of the fly wheel, therefore it will be seen that the clutch unit as a whole may be easily and quickly attached to the fly wheel within the chamber 4 by means of the bolts 9, and as the clutch is already adjusted, it will not be necessary to again adjust the clutch. Secured to the inner side of the annular member 7 is a disc 10, which disc is held in place by means of screws 11 and has secured thereto by means of rivets 12 a fibre disc 13. It will be seen that when the fly wheel 3 rotates, that the annular member 7 and the disc 10 will also rotate. The annular member 7 and the flange 8 may be formed from an aluminum casting, thereby reducing the machine work to a minimum.

Secured to the inner periphery of the member 7 and transversely thereof by means of rivets 14 is a guide rib 15, which rib is received in the notches 16 of the discs 17, which discs are drive discs. By securing the rib 15 to the inner periphery of the annular member 7, it will be seen that the necessity of machining is obviated. Disposed between the drive discs 17 are driven discs 18, which discs surround a spider 19 carried by the driven shaft 20 and are axially movable thereon and rotatable therewith. The driven discs 18 are provided with recesses 21 which receive the rib 22 carried by the spider 19 and secured thereto by the rivets 23. It will be seen that by so securing the rib 22, that machining or slotting will be obviated and consequently the cost of construction reduced to a minimum. The drive discs 17 have secured thereto fibre discs 24, which discs take up the wear during clutch operations. Disposed within the annular member 7 is a pressure plate 25, which plate is provided with an offset flange 26 which engages and has secured thereto a fibre disc 26$^a$ which in turn engages one of the driven discs 18. The pressure plate 25 is secured at 27 to the inner end of the releasing sleeve 28 and is controlled in its inward and outward movement during a clutch operation by said sleeve, or by the spring 29 which surrounds the driven shaft 20 and is interposed between the pressure plate and the cover plate 30, which cover plate is supported on stud bolts 31 threaded into the outer edge of the annular member 7. It will be seen that by adjusting the cover plate 30 inwardly by tightening the nuts 32 carried by the cover plate 30 that the tension on the spring 29 may be varied, thereby varying the frictional engagement of the clutch discs. It will also be seen that this adjustment may be made and the clutch unit shipped in adjusted condition. When it is desired to vary the pressure on the discs it will only be necessary to adjust the nuts 32. However if it is desired to change the number of discs, for instance to adjust the clutch unit for a light duty motor or for a heavy duty motor, the nuts 32 are removed, then the cover plate and spring 29 are removed. After the cover plate and spring 29 have been removed, the pressure plate 25 which has a notch engagement 33 with the rib 15 is then removed, after which the discs may be varied as desired.

To accurately adjust the cover plate 30 and pressure plate 25 in parallel relation to each other, thereby causing a uniform pressure to be applied on the discs at all times, the stud bolts 31 are provided with spaced apertures 34, which apertures are located at equal distances from the outer face of the annular member 7, thereby allowing cotter pins 35 to be inserted through apertures 34 of equal distance from the outer side of the annular member 7 and adjacent the outer faces 36 of the nuts after which the nuts can be unscrewed until they engage the cotter pins, and as the apertures 34 are equally spaced from the annular member 7, the cover plate 30 will be held in parallel relation to the pressure plate 25, and consequently a uniform pressure will be applied to the discs.

From the above it will be seen that a self-contained clutch unit is provided, which unit is simple in construction, the parts reduced to a minimum, and which may be shipped assembled and in adjusted condition, thereby obviating the necessity of adjustment when applied to a fly wheel. It will also be seen that machining has practically been obviated by the parts being so constructed that many of them can be stamped.

The invention having been set forth what is claimed as new and useful is:—

A clutch comprising an annular casing, an outwardly extending annular flange carried by said casing and forming means for securing the clutch to an annular flange of a drive member, a plate carried by the inner face of the annular casing, a shaft rotatably mounted axially of the annular casing, a spider carried by said shaft, discs axially movable on the spider and in the annular casing, detachable guide ribs carried by the spider and the casing and disposed within the recesses of alternate discs, a pressure plate engaging the outer disc and having a notch engagement with the rib carried by the annular casing, studs extending outwardly from the outer side of the annular casing, a cover plate carried by said studs, and a spring surrounding the shaft and interposed between the pressure plate and the cover plate.

In testimony whereof I affix my signature.

CLARENCE G. WOOD.